(12) United States Patent
Katsuki et al.

(10) Patent No.: US 11,469,653 B2
(45) Date of Patent: Oct. 11, 2022

(54) METHOD OF MANUFACTURING ROTATING BODY

(71) Applicants: Mitsui High-tec, Inc., Kitakyushu (JP); TOYOTA JIDOSHA KABUSHIKI KAISHA, Toyota (JP)

(72) Inventors: Kenji Katsuki, Kitakyushu (JP); Takashi Fukumoto, Kitakyushu (JP); Yasutaka Oba, Kitakyushu (JP); Go Kato, Kitakyushu (JP); Masashi Matsumoto, Nagoya (JP)

(*) Notice: Subject to any disclaimer, the term of this patent is extended or adjusted under 35 U.S.C. 154(b) by 24 days.

(21) Appl. No.: 17/016,374

(22) Filed: Sep. 10, 2020

(65) Prior Publication Data
US 2020/0412212 A1    Dec. 31, 2020

Related U.S. Application Data

(63) Continuation of application No. PCT/JP2019/007590, filed on Feb. 27, 2019.

(30) Foreign Application Priority Data

Mar. 16, 2018 (JP) .............................. JP2018-049480
Jul. 31, 2018 (JP) .............................. JP2018-144338

(51) Int. Cl.
*H02K 15/02* (2006.01)
*H02K 15/03* (2006.01)
(Continued)

(52) U.S. Cl.
CPC ............. *H02K 15/03* (2013.01); *H02K 1/276* (2013.01); *H02K 1/28* (2013.01); *H02K 15/12* (2013.01); *Y10T 29/49012* (2015.01)

(58) Field of Classification Search
CPC ......... Y10T 29/49012; Y10T 29/49009; Y10T 29/4902; H02K 15/0012; H02K 1/26; H02K 15/02
(Continued)

(56) References Cited

U.S. PATENT DOCUMENTS 6,084,330 A    7/2000  Fisher et al.
11,050,328 B2 *  6/2021  Ushida .................. H02K 15/03
(Continued)

FOREIGN PATENT DOCUMENTS

JP    H11-318048    11/1999
JP    2006-204068    8/2006
(Continued)

OTHER PUBLICATIONS

Extended Search Report in corresponding European Application No. 19766827.0, dated Nov. 15, 2021.
(Continued)

*Primary Examiner* — Thiem D Phan
(74) *Attorney, Agent, or Firm* — Soei Patent & Law Firm

(57) ABSTRACT

A method of manufacturing a rotating body includes disposing an end plate on an end surface of the core body in a height direction, and forming the rotating body by welding the end plate and the core body together. The rotating body is formed by welding the end plate and the core body together while a temperature of the core body and the end plate is within a predetermined operational a temperature range associated with rotation of the rotating body in a manufactured state of operation.

9 Claims, 10 Drawing Sheets

(51) Int. Cl.
*H02K 1/276* (2022.01)
*H02K 1/28* (2006.01)
*H02K 15/12* (2006.01)

(58) Field of Classification Search
USPC .......... 29/598, 596, 604, 609, 732, 738
See application file for complete search history.

(56) References Cited

U.S. PATENT DOCUMENTS

| | | |
|---|---|---|
| 2006/0144668 A1 | 7/2006 | Voegele |
| 2009/0189309 A1 | 7/2009 | Matsubayashi et al. |
| 2010/0019589 A1 | 1/2010 | Saban et al. |
| 2011/0248596 A1 | 10/2011 | Utaka et al. |
| 2011/0316382 A1 | 12/2011 | Komada et al. |
| 2018/0006509 A1 | 1/2018 | Kato et al. |
| 2019/0097503 A1 | 3/2019 | Uchida et al. |

FOREIGN PATENT DOCUMENTS

| | | |
|---|---|---|
| JP | 2006-255732 | 9/2006 |
| JP | 2007-282358 | 10/2007 |
| JP | 2007-282392 | 10/2007 |
| JP | 2008-042967 | 2/2008 |
| JP | 2010-130885 | 6/2010 |
| JP | 2010-288417 | 12/2010 |
| JP | 2011-067094 | 3/2011 |
| JP | 2011-088329 | 5/2011 |
| JP | 2011-234606 | 11/2011 |
| JP | 2017-225304 | 12/2017 |
| JP | 2018-082539 | 5/2018 |
| WO | 2007/080661 | 7/2007 |
| WO | 2011/114414 | 9/2011 |
| WO | 2014/208582 | 12/2014 |
| WO | 2017/159348 | 9/2017 |

OTHER PUBLICATIONS

International Search Report dated Jun. 4, 2019 for PCT/JP2019/007590.
Akitoshi Hiroe & Masanobu Motoyoshi, "Introduction to Plastic Molding", Nikkan Kogyo Shimbun, Ltd. (with English partial translation).
Kunihiko Sato, "Overview of Welding & Joint Engineering", Rikogakusha Publishing Co , Ltd (with English partial translation).
International Preliminary Report on Patentability with Written Opinion dated Oct. 1, 2020 for PCT/JP2019/007590.
SOEI Patent and Law Firm, Statement of Related Matters, dated Nov. 2, 2020.
Extended Search Report in corresponding European Application No. 20200503.9, dated Mar. 25, 2021.

* cited by examiner

METHOD OF MANUFACTURING ROTATING BODY

CROSS-REFERENCE TO RELATED APPLICATIONS

This application is a continuation application of PCT Application No. PCT/JP2019/007590 filed on Feb. 27, 2019, which claims the benefit of priority from Japanese Patent Application No. 2018-049480, filed on Mar. 16, 2018, and from Japanese Patent Application No. 2018-144338, filed on Jul. 31, 2018, the entire contents of which are incorporated herein by reference.

FIELD

The present disclosure relates to a method of manufacturing a rotating body.

BACKGROUND

Japanese Unexamined Patent Publication No. 2011-067094 discloses a rotor core for use in an interior permanent magnet (IPM) motor. The rotor core includes a core body having a plurality of magnet insertion holes at predetermined intervals around a rotation axis, each magnet insertion hole passing through and extending in the extending direction of the rotation axis, permanent magnets disposed in the magnet insertion holes, and solidified resin filling each insertion hole and solidified.

SUMMARY

An example method of manufacturing a rotating body may include disposing an end plate on an end surface of the core body in a height direction, and forming a rotating body by welding the end plate and the core body together. The rotating body may be formed by welding the end plate and the core body together while a temperature of the core body and the end plate is within a predetermined operational a temperature range associated with rotation of the rotating body in a manufactured state of operation.

DETAILED DESCRIPTION

In the following description, with reference to the drawings, the same reference numbers are assigned to the same components or to similar components having the same function, and overlapping description is omitted.

Configuration of Rotor

Figure 1:
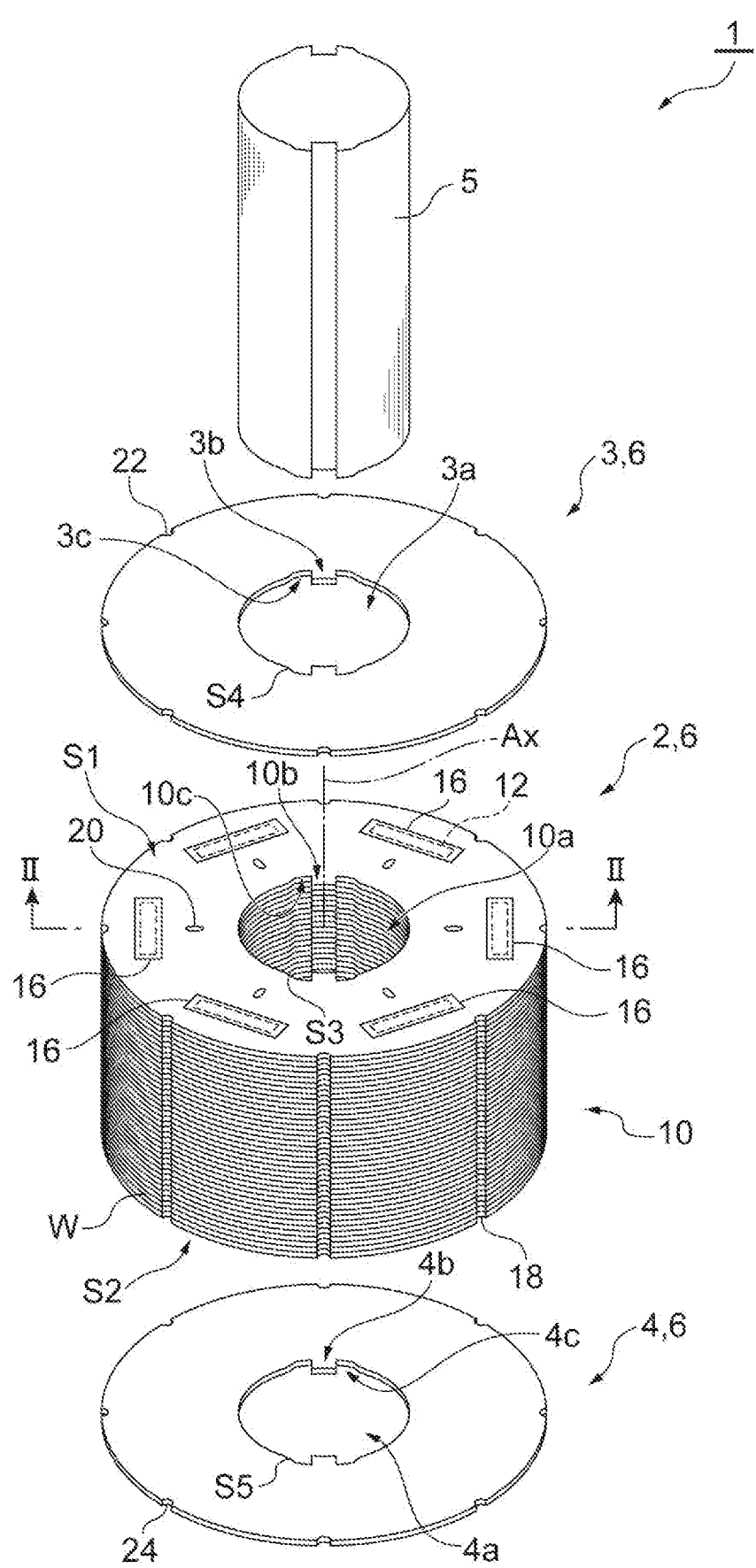
FIG. 1 is an exploded perspective view illustrating an example rotor.
Figure 2:
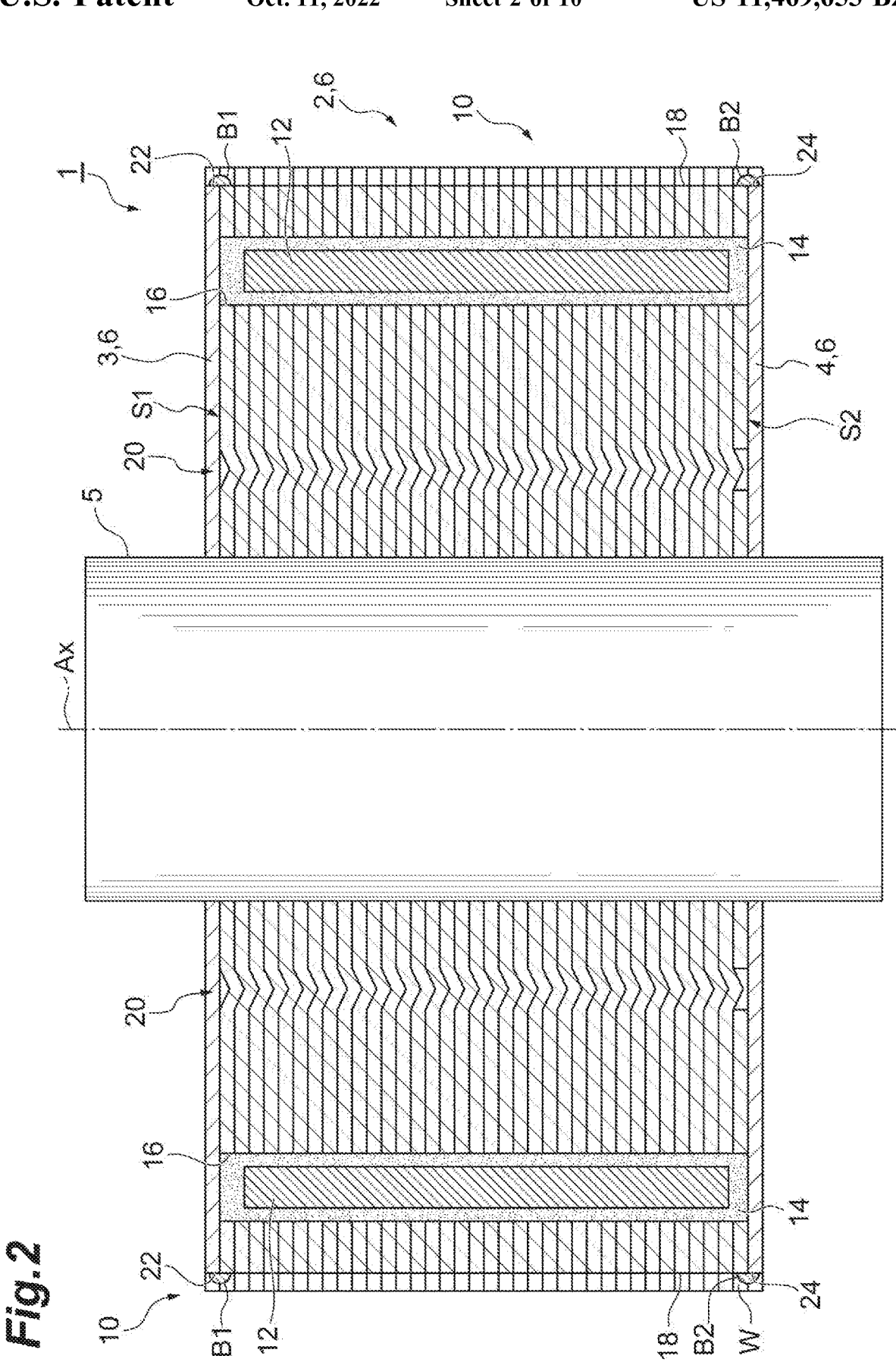
FIG. 2 is a cross-sectional view along line II-II in FIG. 1.

Referring to FIG. 1 and FIG. 2, a configuration of a rotor 1 is described. The rotor 1 is combined with a stator to form a motor. The rotor 1 may constitute an interior permanent magnet (IPM) motor. When power is supplied to the motor, the temperature of the rotor 1 and the stator increases with the rotation of the rotor 1. The temperature range (temperature range in operation) of the core body (the rotor 1 or the stator) during operation of the motor (during rotation of the rotor 1) is, for example, about 70° C. to 90° C., although the range may vary with the applications of the motor.

The rotor 1 includes a stacked rotor core 2 (rotor core), end plates 3 and 4, and a shaft 5.

The stacked rotor core 2 includes a stack 10 (core body), a plurality of permanent magnets 12, and a plurality of solidified resins 14 (resin portions).

As illustrated in FIG. 1, the stack 10 has a cylindrical shape. An axial hole 10a (second axial hole) passing through the stack 10 so as to extend along the center axis Ax is provided at the center portion of the stack 10. The axial hole 10a extends in the stacking direction of the stack 10 (hereinafter simply referred to as "stacking direction"). The stacking direction is the height direction of the stack 10 and is the extending direction of the center axis Ax. Since the stack 10 rotates around the center axis Ax, the center axis Ax also serves as the axis of rotation.

A pair of ridges 10b and a plurality of depressed grooves 10c are formed on the inner peripheral surface of the axial hole 10a. The ridges 10b and the depressed grooves 10c are all extend in the stacking direction from an upper end surface S1 (first end surface) to a lower end surface S2 (second end surface) of the stack 10. A pair of ridges 10b face each other with the center axis Ax interposed therebetween and protrude from the inner peripheral surface of the axial hole 10a toward the center axis Ax. One depressed groove 10c is positioned on each of both sides of one ridge 10b. One side surface (a side surface positioned away from the ridge 10b) of the depressed groove 10c is an inclined surface S3 (second inclined surface) intersecting obliquely to the radial direction of the stack 10. The inner peripheral surface of the axial hole 10a includes the inclined surface S3.

The stack 10 has a plurality of magnet insertion holes 16 (resin injection portions). As illustrated in FIG. 1, the magnet insertion holes 16 are arranged at predetermined intervals along the outer peripheral edge of the stack 10. As illustrated in FIG. 2, the magnet insertion hole 16 passes through the stack 10 so as to extend along the center axis Ax. The magnet insertion hole 16 extends in the stacking direction.

The shape of the magnet insertion hole 16 is an elongated hole extending along the outer peripheral edge of the stack 10. There may be six magnet insertion holes 16. The magnet insertion holes 16 are arranged at predetermined intervals along the outer peripheral edge of the stack 10 as viewed from above. The position, the shape, and the number of magnet insertion holes 16 may be changed, for example, according to the application of the motor and the required performance.

A plurality of depressed grooves 18 are formed on the outer peripheral surface of the stack 10. The depressed groove 18 extends in the stacking direction from the upper end surface S1 to the lower end surface S2 of the stack 10. Eight depressed grooves 18 may be formed approximately at 45° intervals around the center axis Ax on the outer peripheral surface of the stack 10.

The stack 10 is configured such that a plurality of blanked members W are stacked. The blanked member W is a plate-shaped part formed by blanking an electrical steel sheet ES described later into a predetermined shape and has a shape corresponding to the stack 10. The stack 10 may be configured by rotational stacking. "Rotational stacking" refers to stacking a plurality of blanked members W while shifting the angle of the blanked members W relative to each other. The rotational stacking is performed mainly for cancelling out the plate thickness deviations of the blanked member W. The angle of the rotational stacking may be set to a desired value.

As illustrated in FIG. 1 to FIG. 2, the blanked members W adjacent in the stacking direction may be fastened to each other by connecting tab portions 20. These blanked members W may be fastened to each other by a variety of known methods instead of the connecting tab portions 20. For example, a plurality of blanked members W may be joined to each other by adhesive or a resin material or joined to each other by welding. Alternatively, a blanked member W may be provided with a temporarily-connecting tab, and after a plurality of blanked members W may be fastened to each other through temporarily-connecting tabs to produce a stack 10, the temporarily-connecting tabs may be removed from the stack. The "temporarily-connecting tab" means a connecting tab used for temporarily integrating a plurality of blanked members W and removed in the process of producing the stacked rotor core 2.

As illustrated in FIG. 1 and FIG. 2, one permanent magnet 12 is inserted in each of the magnet insertion holes 16. The permanent magnet 12 may have the shape of, but not limited to, a rectangular parallelepiped. The kind of permanent magnets 12 may be determined according to the application of the motor, the required performance, and the like and may be, for example, sintered magnets or bonded magnets.

After the permanent magnet 12 is inserted, the magnet insertion hole 16 is filled with a resin material in a melted state (molten resin), and the molten resin is solidified to form the solidified resin 14. The solidified resin 14 is configured to fix the permanent magnet 12 in the magnet insertion hole 16 and to join the blanked members W adjacent in the stacking direction (top-bottom direction) together. Examples of the resin material forming the solidified resin 14 may include thermosetting resins and thermoplastic resins. A specific example of the thermosetting resin may be a resin composition including epoxy resin, a cure initiator, and an additive. Examples of the additive may include filler, fire retardant, and stress reducer.

As illustrated in FIG. 1, the end plates 3 and 4 have an annular shape. Axial holes (first axial hole) 3a and 4a passing through the end plates 3 and 4, respectively, are provided at the central portion of the end plates 3 and 4.

A pair of protrusions 3b and a pair of notches 3c are formed on the inner peripheral surface of the axial hole 3a. A pair of protrusions 3b face each other with the center axis Ax interposed therebetween and protrude from the inner peripheral surface of the axial hole 3a toward the center axis Ax. One notch 3c is positioned on each of both sides of one protrusion 3b. One side surface (a side surface positioned away from the protrusion 3b) of the notch 3c is an inclined surface S4 (second inclined surface) intersecting obliquely to the radial direction of the end plate 3. The inner peripheral surface of the axial hole 3a includes the inclined surface S4.

A pair of protrusions 4b and a plurality of notches 4c are also formed on the inner peripheral surface of the axial hole 4a, in the same manner as the axial hole 3a. The configuration of the protrusions 4b and the notches 4c is similar to the protrusions 3b and the notches 3c and will not be further explained. The inner peripheral surface of the axial hole 4a also includes an inclined surface S5 (second inclined surface) intersecting obliquely to the radial direction of the end plate 4.

A plurality of notches 22 are formed on the outer peripheral surface of the end plate 3. Eight notches 22 may be formed approximately at 45° intervals around the center axis Ax on the outer peripheral surface of the end plate 3. A plurality of notches 24 are also formed on the outer peripheral surface of the end plate 4, in the same manner as the end plate 3. Eight notches 24 may be formed approximately at 45° intervals around the center axis Ax on the outer peripheral surface of the end plate 4.

The end plates 3 and 4 are disposed on the upper end surface S1 and the lower end surface S2, respectively, of the stack 10 and joined to the stack 10 by welding. As illustrated in FIG. 2, the end plate 3 is joined to a blanked member W positioned in the vicinity of the upper end of the stack 10 through a weld bead B1 provided across the depressed groove 18 and the notch 22. Similarly, the end plate 4 is joined to a blanked member W positioned in the vicinity of the lower end of the stack 10 with a weld bead B2 provided across the depressed groove 18 and the notch 24. The stacked rotor core 2 and the end plates 3 and 4 are integrated by welding to form one rotating body 6 (core product).

The end plates 3 and 4 may be formed of stainless steel. Examples of the stainless steel may include austenite-based stainless steel (for example, SUS304). The end plates 3 and 4 may be formed of a non-magnetic material. The thermal expansion coefficient of the end plates 3 and 4 is typically higher than the thermal expansion coefficient of electrical steel sheets but may be equivalent to the thermal expansion coefficient of electrical steel sheets or may be smaller than the thermal expansion coefficient of electrical steel sheets.

The shaft 5 has a cylindrical shape as a whole. A pair of depressed grooves 5a are formed on the shaft 5. The depressed groove 5a extends from one end to the other end of the shaft 5 in the extending direction of the shaft 5. The shaft 5 is inserted in the axial holes 3a, 4a, and 10a. The protrusions 3b and 4b and the ridge 10b are engaged with the depressed groove 5a. With this configuration, rotational force is transmitted between the shaft 5 and the stacked rotor core 2.

Apparatus for Manufacturing Rotor

Referring now to FIG. 3 to FIG. 6, an apparatus 100 for manufacturing the rotor 1 is described.

The apparatus 100 is an apparatus for manufacturing the rotor 1 from an electrical steel sheet ES (workpiece plate) which is a strip-like metal plate. The apparatus 100 includes an uncoiler 110, a feeding device 120, a blanking device 130, a resin injecting device 140, a welding device 150, a shaft attaching device 160, and a controller Ctr (control unit).

The uncoiler 110 rotatably holds a coil material 111 with the coil material 111 attached thereto. The coil material 111 is a strip-like electrical steel sheet ES wound into a coil shape. The feeding device 120 has a pair of rollers 121 and 122 sandwiching the electrical steel sheet ES from above and below. A pair of rollers 121 and 122 rotate and stop based on an instruction signal from the controller Ctr and successively feed the electrical steel sheet ES intermittently toward the blanking device 130.

The blanking device 130 operates based on an instruction signal from the controller Ctr. The blanking device 130 is configured to successively blank the electrical steel sheet ES intermittently fed by the feeding device 120 to form blanked members W and to successively stack the blanked members W obtained by blanking to produce a stack 10.

The stack 10 is discharged from the blanking device 130 and then placed onto a conveyor Cv1 extending between the blanking device 130 and the resin injecting device 140. The conveyor Cv1 operates based on an instruction from the controller Ctr and feeds the stack 10 to the resin injecting device 140.

The resin injecting device 140 operates based on an instruction signal from the controller Ctr. The resin injecting device 140 is configured to insert a permanent magnet 12 into each magnet insertion hole 16 and to charge molten resin into the magnet insertion hole 16 having the permanent magnet 12 inserted therein. As illustrated in detail in FIG. 4, the resin injecting device 140 includes a lower mold 141, an upper mold 142, and a plurality of plungers 143.

The lower mold 141 includes a base member 141a and an insertion post 141b provided on the base member 141a. The base member 141a is a plate-like member having a rectangular shape. The base member 141a is configured such that a stack 10 can be placed thereon. The insertion post 141b is positioned approximately at the central portion of the base member 141a and protrudes upward from the upper surface of the base member 141a. The insertion post 141b has a cylindrical shape and has an outer shape corresponding to the axial hole 10a of the stack 10.

The upper mold 142 is configured such that a stack 10 is sandwiched between the upper mold 142 and the lower mold 141 in the stacking direction (the height direction of the stack 10). The upper mold 142 includes a base member 142a and a built-in heat source 142b.

The base member 142a is a plate-like member having a rectangular shape. The base member 142a has one through hole 142c and a plurality of accommodation holes 142d. The through hole 142c is positioned approximately at the central portion of the base member 142a. The through hole 142c has a shape (substantially circular shape) corresponding to the insertion post 141b, and the insertion post 141b can be inserted into the through hole 142c.

A plurality of accommodation holes 142d pass through the base member 142a and are arranged at predetermined intervals along the periphery of the through hole 142c. The accommodation holes 142d are positioned at places corresponding to the magnet insertion holes 16 of the stack 10 when the lower mold 141 and the upper mold 142 sandwich the stack 10. Each accommodation hole 142d has a cylindrical shape and is configured to accommodate at least one resin pellet P.

The built-in heat source 142b is, for example, a heater built in the base member 142a. When the built-in heat source 142b operates, the base member 142a is heated to heat the stack 10 in contact with the base member 142a and heat the resin pellet P accommodated in each accommodation hole 142d. The resin pellet P then melts and changes into molten resin.

A plurality of plungers 143 are positioned above the upper mold 142. Each plunger 143 is configured so as to be insertable into and removable from the corresponding accommodation hole 142d by a not-illustrated drive source.

The stack 10 is discharged from the resin injecting device 140 and then placed onto a conveyor Cv2 extending between the resin injecting device 140 and the welding device 150. The conveyor Cv2 operates based on an instruction from the controller Ctr and feeds the stack 10 to the welding device 150.

The welding device 150 operates based on an instruction signal from the controller Ctr. The welding device 150 is configured to welds the stacked rotor core 2 and the end plates 3 and 4 together. As illustrated in detail in FIG. 5, the welding device 150 includes a pair of welders M10 and M20. The welder M10 is positioned below the stacked rotor core 2 and the end plates 3 and 4, and the welder M20 is positioned above the stacked rotor core 2 and the end plates 3 and 4.

The welder M10 includes a frame M11 (second sandwiching member), a rotating table M12, a pair of positioning members M13, a plunger member M14, and a plurality of welding torches M15 (second welding torch). The frame M11 supports the rotating table M12, the positioning members M13, and the plunger member M14. The rotating table M12 is attached so as to be rotatable on the frame M11. A built-in heat source M16 (heating source) is provided inside the rotating table M12. For example, the built-in heat source M16 may be a heater.

The positioning members M13 are attached to the rotating table M12 so as to be movable in the radial direction (left-right direction in FIG. 5) of the center axis Ax of the stacked rotor core 2. The positioning members M13 can support the stacked rotor core 2 and the end plates 3 and 4 placed thereon.

Figure 6:
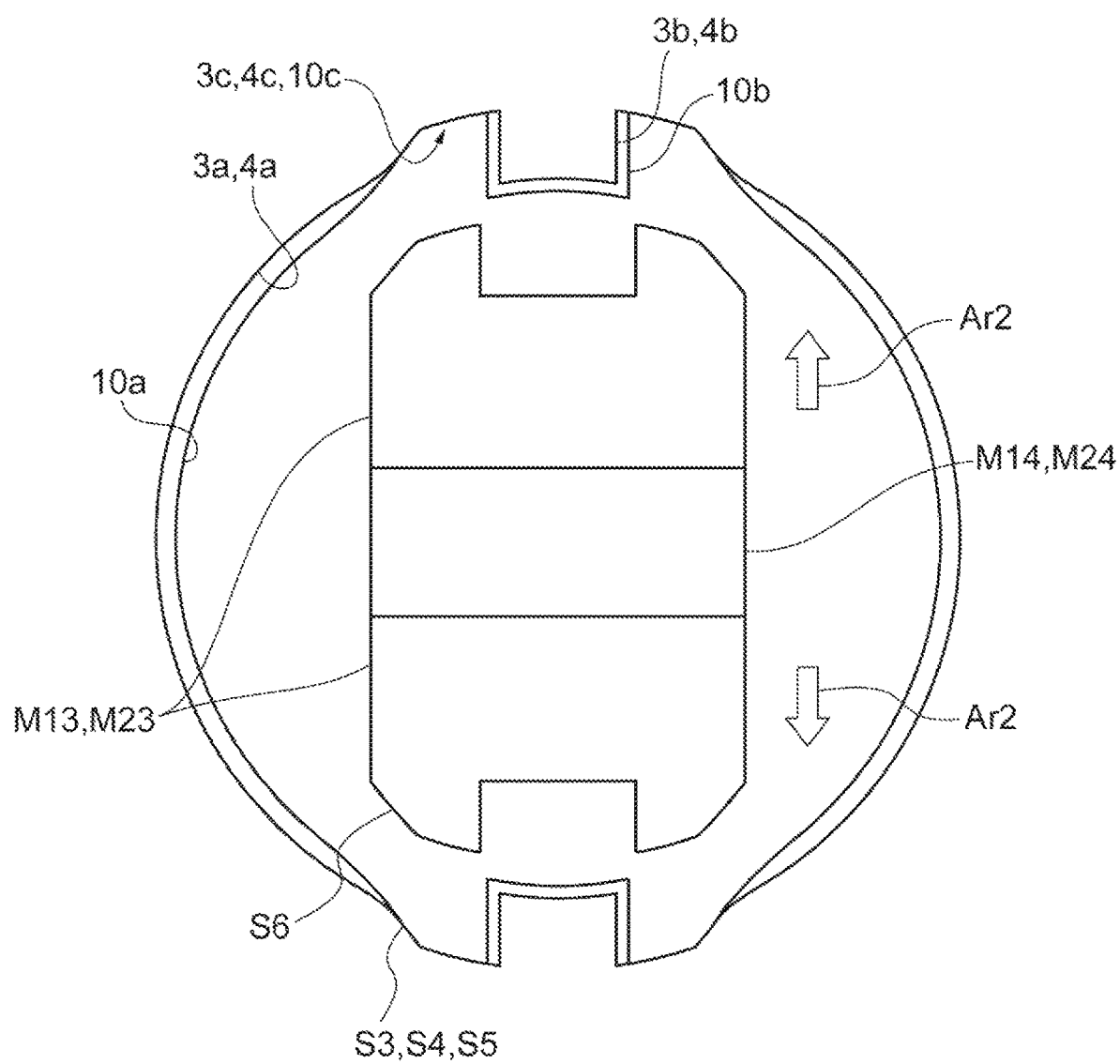
FIG. 6 is a top view illustrating positioning of the end plates to the stack by a positioning member.

The inner surface of the positioning member M13 has an inclined surface expanding outward in the downward direction. As illustrated in FIG. 6, an end of the positioning member M13 is divided into two ends, each of which has the shape corresponding to the inner peripheral surface of the notch 4c and the depressed groove 10c. Each end of the positioning member M13 includes an inclined surface S6 (first inclined surface) intersecting obliquely to the moving direction of the positioning member M13 and having a shape corresponding to the inclined surfaces S4 and S5.

The plunger member M14 is positioned between a pair of positioning members M13. The plunger member M14 has a trapezoidal shape in cross section with its diameter reducing toward the front end (upper end). The side surface of the plunger member M14 has an inclined surface corresponding to the inner surface of the positioning member M13. Therefore, when the plunger member M14 is pushed upward (see arrow Ar1 in FIG. 5), a pair of positioning members M13 are pushed outward so as to move apart from each other (the left-right direction in FIG. 5; see arrows Ar2 in FIG. 6). On the other hand, when the plunger member M14 is pulled downward, a pair of positioning members M13 move inward (the left-right direction in FIG. 5) so as to approach each other.

The welding torch M15 is configured to weld the end plate 4 and the stack 10 together. The welding torch M15 is, for example, a torch for laser welding. A plurality of welding torches M15 are arranged along the periphery of the rotating table M12.

Similarly to the welder M10, the welder M20 also includes a frame M21 (first sandwiching member), a rotating table M22 containing a built-in heat source M26 (heating source), a pair of positioning members M23, a plunger member M24, and a plurality of welding torches M25 (first welding torch) configured to weld the end plate 3 and the stack 10 together. The configuration of the welder M20 is similar to the welder M10 and will not be further explained.

The stack 10 is discharged from the welding device 150 and then placed onto a conveyor Cv3 extending between the welding device 150 and the shaft attaching device 160. The conveyor Cv3 operates based on an instruction from the controller Ctr and feeds the stack 10 to the shaft attaching device 160.

The shaft attaching device 160 operates based on an instruction signal from the controller Ctr. The shaft attaching device 160 is configured to attach the shaft 5 to the rotating body 6 which is formed to integrate the stacked rotor core 2 and the end plates 3 and 4 by welding. The shaft attaching device 160 shrink-fits the shaft 5 to the axial holes 3a, 4a, and 10a while heating the stacked rotor core 2, the end plates 3 and 4, and the shaft 5. Here, the heating temperature may be, for example, about 150° C. to 300° C.

The controller Ctr generates an instruction signal for operating each of the feeding device 120, the blanking device 130, the resin injecting device 140, the welding device 150, and the shaft attaching device 160, for example, based on a program stored in a recording medium (not illustrated) or an operation input from an operator, and transmits the instruction signal to these devices.

Method of Manufacturing Rotor

Figure 3:
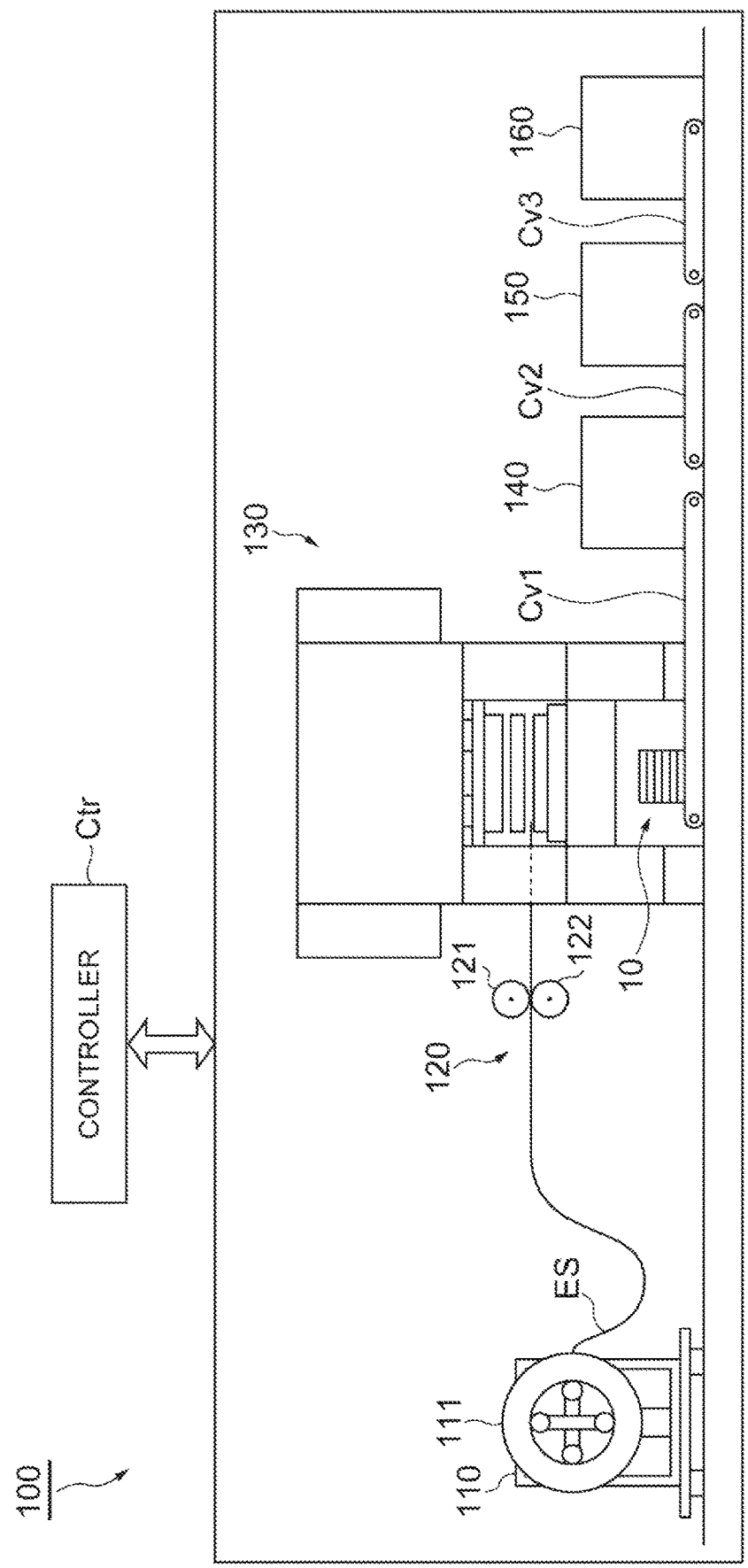
FIG. 3 is a schematic diagram illustrating an example manufacturing apparatus for a rotor.

Referring now to FIG. 3 to FIG. 8, a method of manufacturing a rotor 1 is described. First of all, as illustrated in FIG. 3, while an electrical steel sheet ES is successively blanked by the blanking device 130, the blanked members W are stacked to form a stack 10 (see step S11 in FIG. 7).

Figure 4:
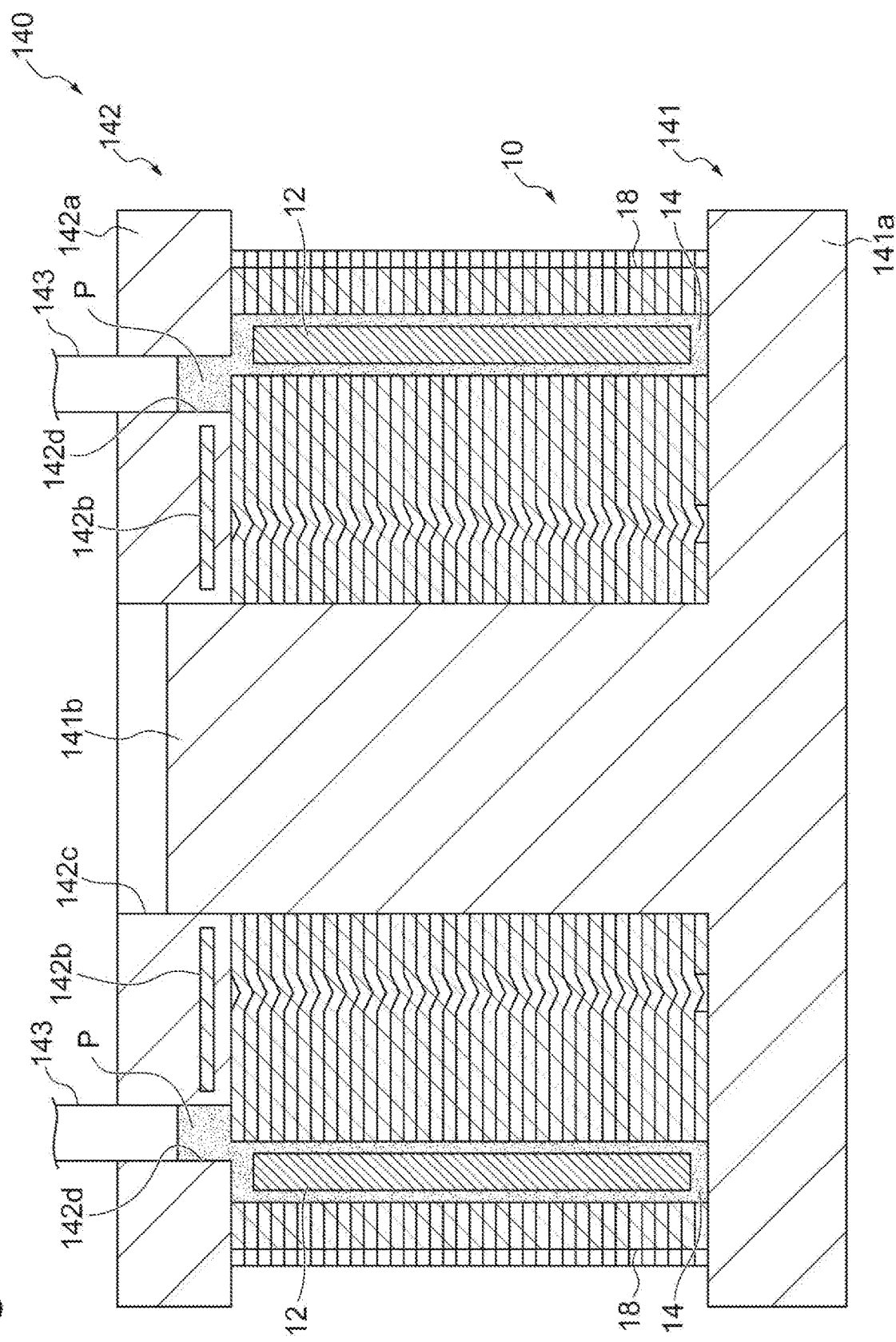
FIG. 4 is a cross-sectional view illustrating injection of molten resin into magnet insertion holes in a stacked rotor core by a resin injecting device.

Subsequently, the stack 10 is conveyed to the resin injecting device 140 and, as illustrated in FIG. 4, the stack 10 is placed on the lower mold 141 of the resin injecting device 140. Next, permanent magnets 12 are inserted into the magnet insertion holes 16 (see step S12 in FIG. 7). The insertion of the permanent magnets 12 into the magnet insertion holes 16 may be manually performed or may be performed by, for example, a robot hand (not illustrated) included in the resin injecting device 140 based on an instruction of the controller Ctr.

Subsequently, the upper mold 142 is placed on the stack 10. The stack 10 is then sandwiched between the lower mold 141 and the upper mold 142 in the stacking direction. Next, resin pellets P are put into the accommodation holes 142d. When the resin pellets P become melted by the built-in heat source 142b in the upper mold 142, the molten resin is injected into the magnet insertion holes 16 by the plungers 143 (see step S13 in FIG. 7). At this moment, the stack 10 is heated, for example, to about 150° C. to 180° C. by the built-in heat source 142b. Subsequently, the molten resin is solidified and then the solidified resins 14 are formed in the magnet insertion holes 16. The lower mold 141 and the upper mold 142 are removed from the stack 10, and the stacked rotor core 2 is completed.

Figure 5:
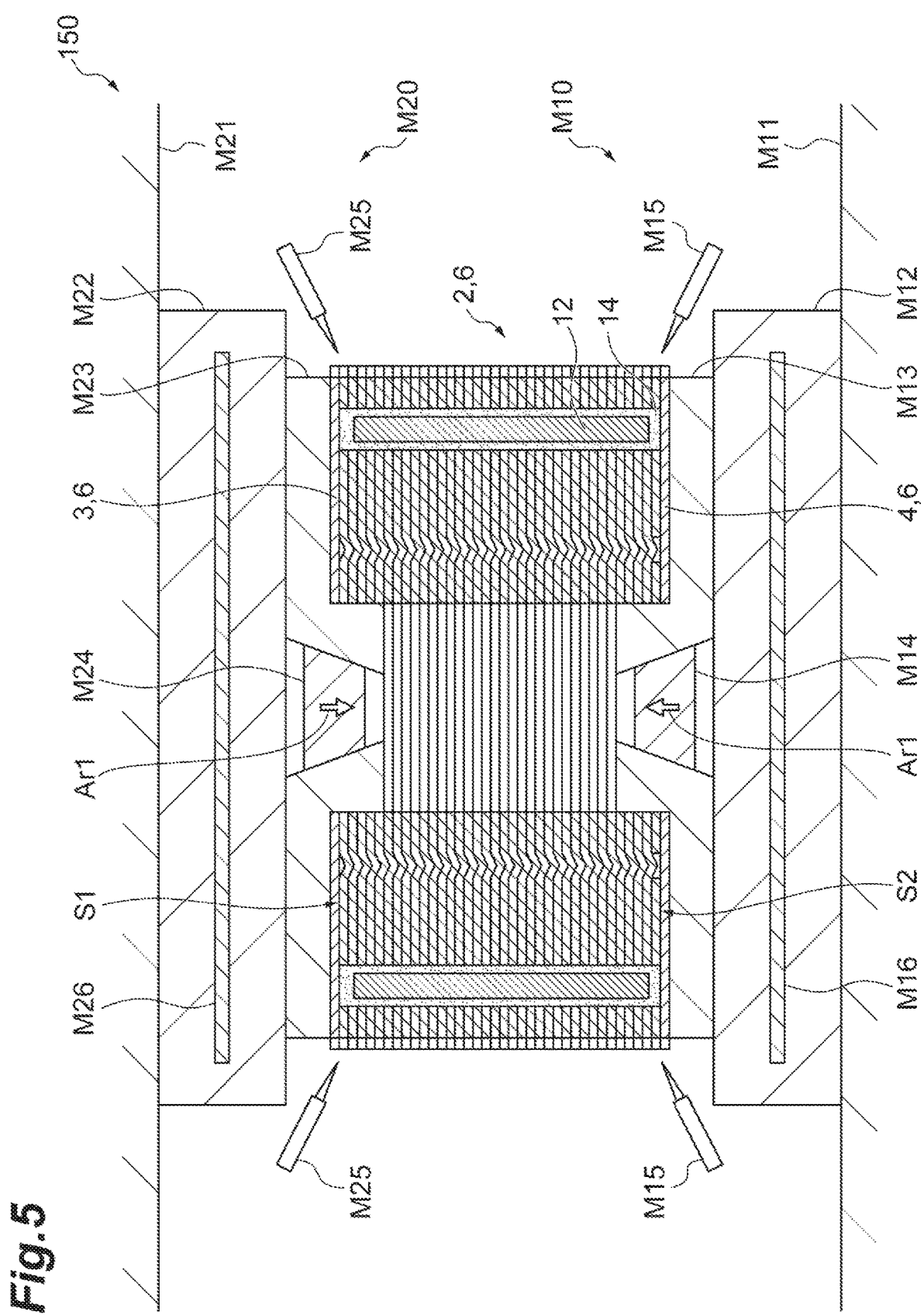
FIG. 5 is a cross-sectional view illustrating welding of end plates to a stack by a welding device.

Subsequently, the stacked rotor core 2 is conveyed to the welding device 150, and as illustrated in FIG. 5, the end plate 3 is disposed on the upper end surface S1 of the stack 10 and the end plate 4 is disposed on the lower end surface S2 of the stack 10. The end plate 4 is placed on the positioning members M13 of the welder M10, the stacked rotor core 2 is placed on the end plate 4, the end plate 3 is placed on the stacked rotor core 2, and the welder M20 is placed on the end plate 3 such that the positioning members M23 face the end plate 3. The stacked rotor core 2 and the end plates 3 and 4 are thus sandwiched between a pair of welders M10 and M20 and pressed by a predetermined pressure. At this moment, the controller Ctr instructs the built-in heat sources M16 and M26 to heat the stacked rotor core 2 and the end plates 3 and 4 and keep their temperature in the temperature range in operation.

When the temperature of the stacked rotor core 2 and the end plates 3 and 4 is in the temperature range in operation, as illustrated in FIG. 6, the inclined surfaces S4 and S5 of the end plates 3 and 4 substantially match (overlap) the inclined surface S6 of the stack 10 as viewed from the center axis Ax direction (from above). On the other hand, a portion other than the inclined surface S4, S5 of the inner peripheral surface of the axial hole 3a, 4a is positioned radially outside (does not overlap) the inclined surface S3 of the inner peripheral surface of the axial hole 10a.

Subsequently, the plunger member M14 is moved upward to expand the pair of positioning members M13 to the left and right, and the plunger member M24 is moved downward to expand the pair of positioning members M23 to the left and right (see arrows Ar2 in FIG. 6). The inclined surface S6 of the positioning member M13 is in contact with the inclined surface S5 of the end plate 4 and the inclined surface S3 of the stack 10 to push them radially outward, so that the end plate 4 is positioned to the stack 10. Similarly, the inclined surface S6 of the positioning member M23 is in contact with the inclined surface S4 of the end plate 3 and the inclined surface S3 of the stack 10 to push them radially outward, so that the end plate 3 is positioned to the stack 10.

Figure 7:
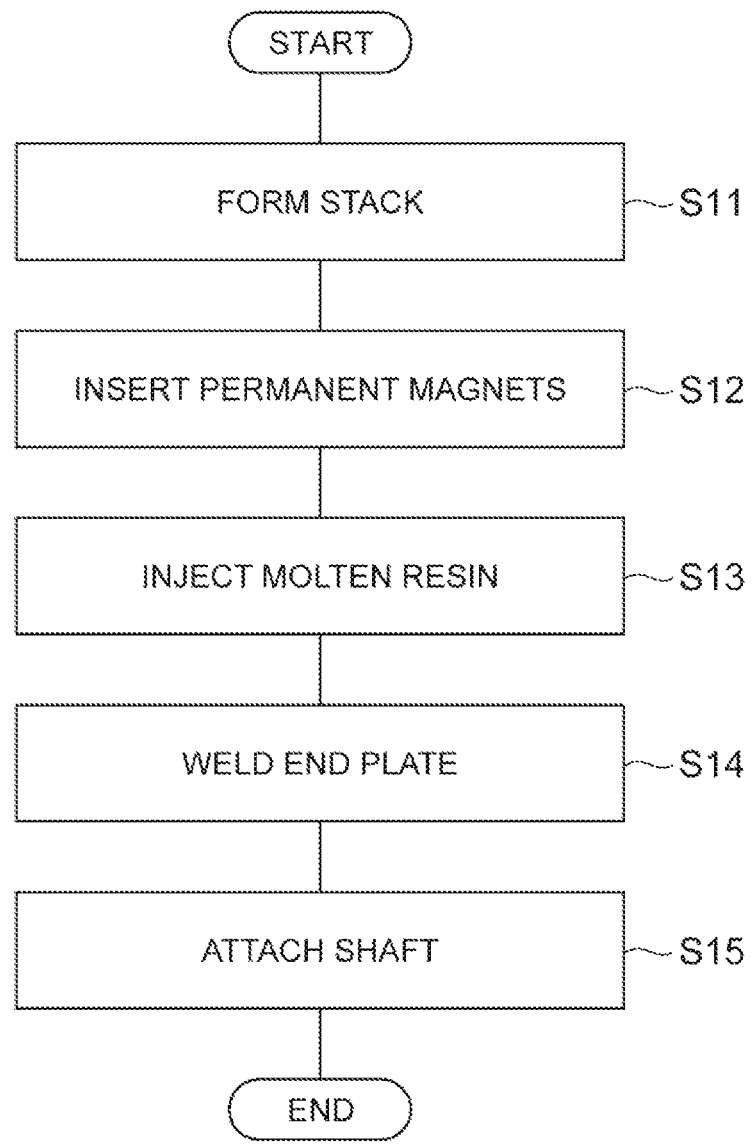
FIG. 7 is a flowchart illustrating an example method of manufacturing a rotor.
Figure 8:
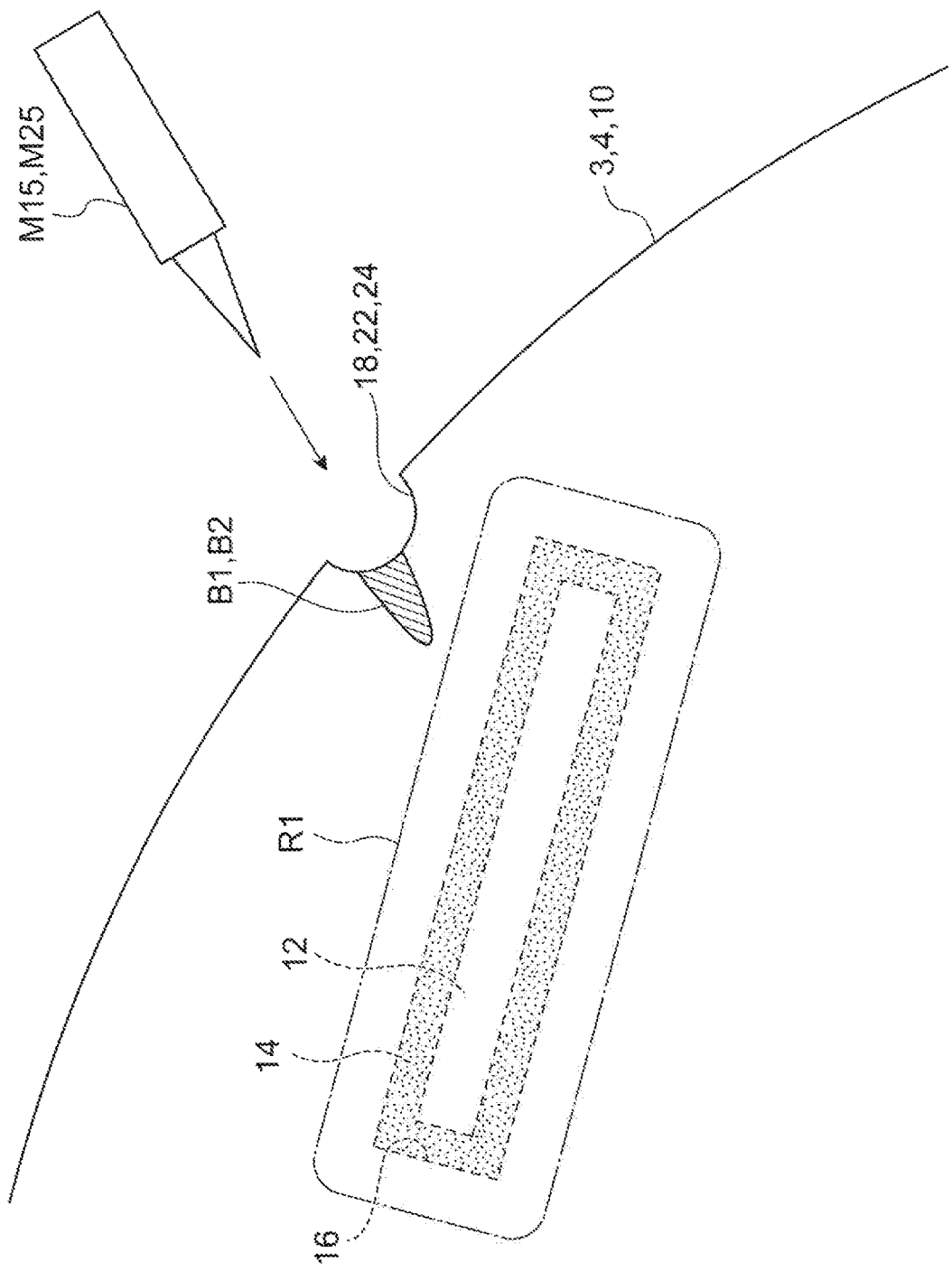
FIG. 8 is a top view illustrating an example relation between a weld bead and a buffer region of a magnet insertion hole.

Subsequently, the controller Ctr instructs the welding torch M15 such that the welding torch M15 emits laser toward the notch 24 and the depressed groove 18 across the end plate 4 and the stack 10. Similarly, the controller Ctr instructs the welding torch M25 such that the welding torch M25 emits laser toward the notch 22 and the depressed groove 18 across the end plate 3 and the stack 10. With this process, as illustrated in FIG. 2 and FIG. 8, with the temperature of the stacked rotor core 2 and the end plates 3 and 4 kept in the temperature range in operation, the end plate 3 and the stack 10 are welded together through the weld beads B1, and the end plate 4 and the stack 10 are welded together through the weld beads B2 (see step S14 in FIG. 7). As a result, the end plates 3 and 4 are joined to the stacked rotor core 2 to form the rotating body 6.

Here, as illustrated in FIG. 8, the direction of laser emitted from welding torch M15, M25, the position irradiated with the laser, the intensity of the laser, etc. may be set such that the weld bead B1, B2 does not overlap a buffer region R1 set so as to surround the magnet insertion hole 16. The buffer region R1 may be spaced apart from the magnet insertion hole 16 by at least 0.5 mm or more.

Subsequently, the controller Ctr instructs the rotating table M22 to actuate the rotating table M22. As described above, since the stacked rotor core 2 and the end plates 3 and 4 are sandwiched between a pair of welders M10 and M20, the rotational force of the rotating table M22 is transmitted to the stacked rotor core 2, the end plates 3 and 4, and the rotating table M12 to rotate them. In this way, while the stacked rotor core 2 and the end plates 3 and 4 are intermittently rotated by the rotating table M22, the inside of the notches 3c and 4c and the depressed grooves 10c are successively irradiated with laser from the welding torches M15 and M25. The order of laser radiation to the inside of the notches 3c and 4c and the depressed grooves 10c is not limited. The inside of the notches 3c and 4c and the depressed grooves 10c not adjacent in the circumferential direction of the center axis Ax may be successively irradiated with laser, or the inside of the notches 3c and 4c and the depressed grooves 10c facing each other with respect to the center axis Ax may be successively irradiated with laser. In this case, heat influence between the welding portions is reduced, so that deformation of the stacked rotor core 2 and the end plates 3 and 4 by heat can be suppressed.

Subsequently, the rotating body 6 is conveyed to the shaft attaching device 160, and the shaft 5 is shrink-fitted to the rotating body 6 (see step S15 in FIG. 7). The rotor 1 is thus completed.

In some examples, the end plate 3, 4 and the stack 10 are welded together such that the weld bead B1, B2 does not reach the buffer region R1 (see FIG. 8). The organic component spreading to the periphery of the magnet insertion hole 16 is therefore less likely to be heated by the weld bead B1, B2, and voids are less likely to be produced in the weld bead B1, B2. A favorable joined state of the end plates 3 and 4 to the stack 10 thus can be maintained.

In some examples, the stack 10 and the end plates 3 and 4 are welded together in a state in which the stack 10 and the end plates 3 and 4 are in the temperature range in operation when the rotating body 6 actually rotates. With this configuration, even when the stack 10 and the end plates 3 and 4 have different thermal expansion coefficients, stress is less likely to act on the weld bead B1, B2 between the stack 10 and the end plate 3, 4 in the actual rotation of the rotating body 6. A favorable joined state of the end plates 3 and 4 to the stack 10 therefore can be maintained.

In some examples, the end plates 3 and 4 and the stack 10 are welded together in a state in which the temperature of the stack 10 and the end plates 3 and 4 is kept in the temperature range in operation by the built-in heat sources M16 and M26. With this configuration, even if it takes time to weld the stack 10 and the end plates 3 and 4 together at a plurality of places, the temperature of the stack 10 and the end plates 3 and 4 is kept in the temperature range in operation during the welding process. With this configuration, a favorable joined state of the end plates 3 and 4 to the stack 10 can be maintained at all the weld beads B1 and B2 between the stack 10 and the end plates 3 and 4.

In some examples, the inclined surfaces S4 and S5 of the end plates 3 and 4 substantially match the inclined surface S6 of the stack 10 in a state in which the temperature of the stacked rotor core 2 and the end plates 3 and 4 is in the temperature range in operation. With this configuration, the end plates 3 and 4 and the stack 10 can be positioned using the inclined surfaces S3 to S5 as a reference. On the other hand, at a portion other than the inclined surfaces S3 to S5, the inner peripheral surface of the axial holes 3a and 4a is positioned radially outside the inner peripheral surface of the axial hole 10a. When the shaft 5 is inserted into the rotating body 6, the insertion of the shaft 5 is not hindered by the end plates 3 and 4. With this configuration, the shaft 5 can be easily attached to the rotating body 6.

In some examples, the end plates 3 and 4 and the stack 10 are welded together in a state in which the end plates 3 and 4 are positioned relative to the stack 10 by the positioning members M13 and M23. This configuration can suppress displacement of the end plates 3 and 4 from the stack 10 by heat during welding.

In some examples, the inclined surfaces S6 of the positioning members M13 and M23 are in contact with the inclined surfaces S3 to S5 of the axial holes 3a, 4a, and 10a, whereby the end plates 3 and 4 are positioned relative to the stack 10 not only in the moving direction (see arrows Ar2 in FIG. 6) of the positioning members M13 and M23 but also in the direction intersecting the moving direction. With this configuration, the end plates 3 and 4 can be positioned relative to the stack 10 more accurately only by moving the positioning members M13 and M23 in one direction (see arrows Ar2 in FIG. 6).

It is to be understood that not all aspects, advantages and features described herein may necessarily be achieved by, or included in, any one particular example. Indeed, having described and illustrated various examples herein, it should be apparent that other examples may be modified in arrangement and detail may be omitted.

Figure 9:
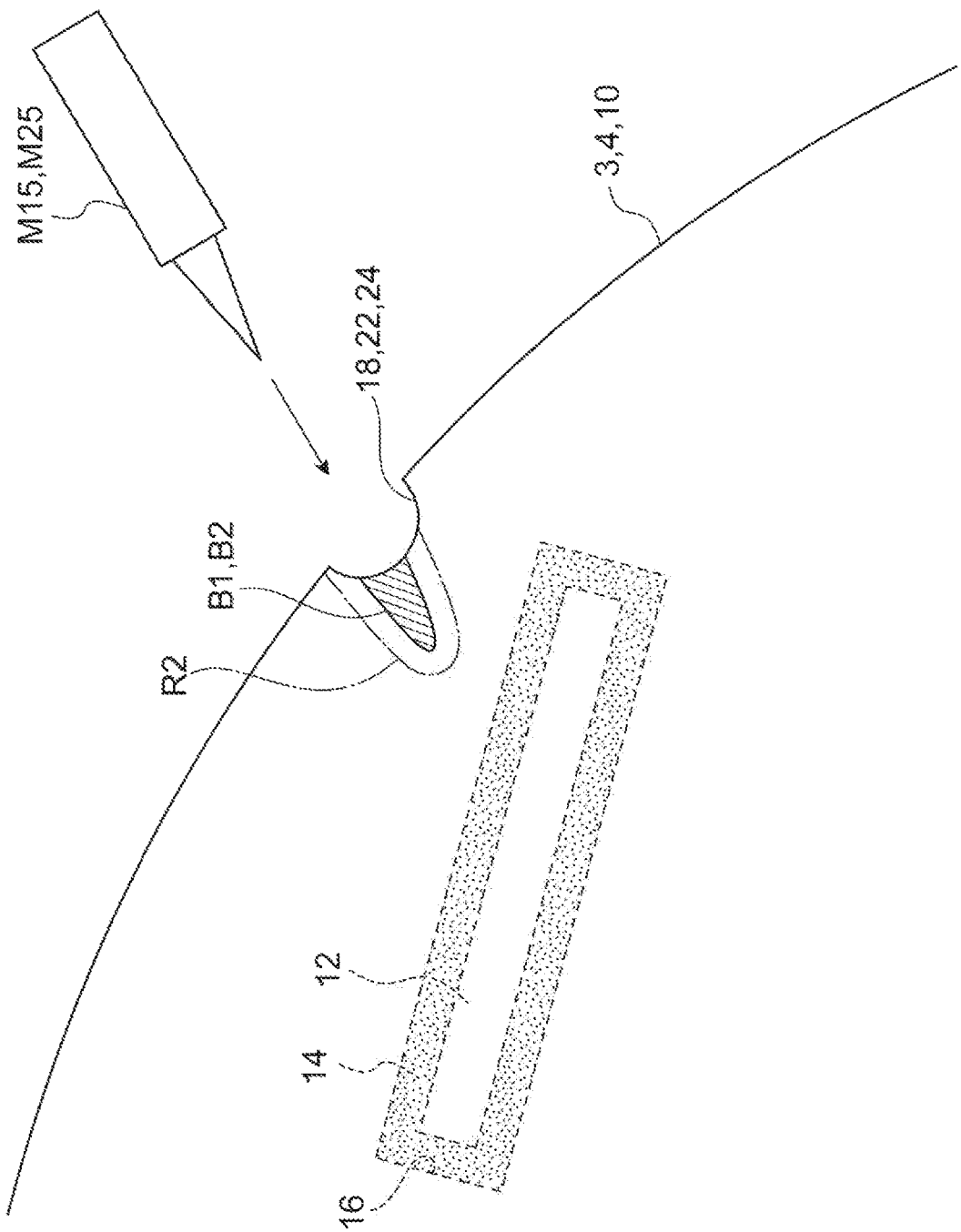
FIG. 9 is a top view illustrating another example relation between a weld bead and a buffer region of a magnet insertion hole.

In some examples, the buffer region R1 is set on the periphery of the magnet insertion hole 16. However, the buffer region is not limited to this as long as it is set between the magnet insertion hole 16 and the weld bead B1, B2. For example, as illustrated in FIG. 9, a buffer region R2 may be set on the periphery of weld bead B1, B2. In this case, the buffer region R2 may be spaced apart from the weld bead B1, B2 by at least 0.5 mm or more.

Figure 10:
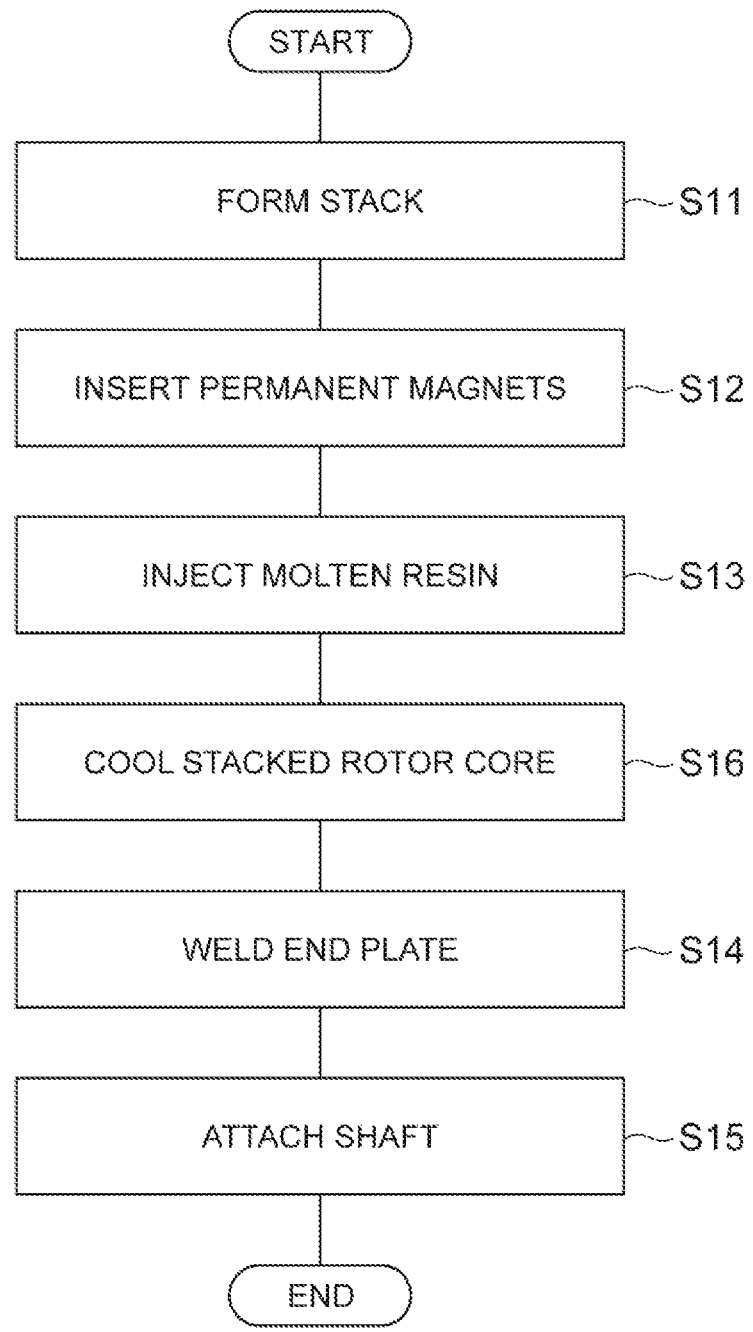
FIG. 10 is a flowchart illustrating another example method of manufacturing a rotor.

In some examples, the temperature of the stacked rotor core 2 is in the temperature range in operation during welding. The stacked rotor core 2 may be cooled until the temperature of the stacked rotor core 2 temporarily falls below the temperature range in operation after the resin sealing process, and the stacked rotor core 2 may be heated until it reaches the temperature range in operation again. Alternatively, the stacked rotor core 2 may be cooled (see step S16 in FIG. 10) after the resin sealing process, and the welding process may be performed when the temperature of the stacked rotor core 2 reaches the temperature range in operation. In this case, since the stacked rotor core 2 and the end plates 3 and 4 are heated sufficiently to a degree that exceeds the temperature range in operation in the resin sealing process, the heat in the resin sealing process is used in order to bring the temperature of the stacked rotor core 2 and the end plates 3 and 4 in the welding process into the temperature range in operation. This eliminates the need for reheating the stacked rotor core 2 and the end plates 3 and 4 using a heating source or the like in order to bring the temperature of the stacked rotor core 2 and the end plates 3 and 4 into the temperature range in operation. Accordingly, the facility cost can be reduced, and the efficient use of heat energy can be achieved. The cooling of the stacked rotor core 2 between the resin sealing process and the welding process may be natural cooling or may be cooling using a not-illustrated cooler. When a cooler is used, the time taken for cooling is reduced compared with natural cooling. Accordingly, the time taken until the welding process is started is reduced, thereby increasing the manufacturing efficiency of the rotating body 6.

In some examples, after the stacked rotor core 2 is produced, the stacked rotor core 2 may be put into a heat retention storage kept in the temperature range in operation in the inside. In this case, temperature drop of the stacked rotor core 2 is avoided even when the production line of the rotor 1 is stopped. With this configuration, reheating the stacked rotor core 2 is not necessary when the operation of the production line is resumed.

In some examples, the temperature of the stacked rotor core 2 when the end plates 3 and 4 are disposed on the stacked rotor core 2 is not limited. The end plates 3 and 4 may be disposed on the stacked rotor core 2 at a temperature below the temperature range in operation. Alternatively, after the resin sealing process, the end plates 3 and 4 may be disposed on the stacked rotor core 2 before the temperature of the stacked rotor core 2 reaches the temperature range in operation or after the temperature of the stacked rotor core 2 falls into the temperature range in operation. In the latter case, when the end plates 3 and 4 are disposed on the end surfaces S1 and S2, respectively, the end plates 3 and 4 are heated by the heat of the stacked rotor core 2, so that the temperature of the end plates 3 and 4 reaches the temperature range in operation. With this configuration, it is not necessary to heat the end plates 3 and 4 separately using a heating source or the like. Accordingly, the facility cost can be reduced, and the efficient use of heat energy can be achieved.

In some examples, in welding of the end plates 3 and 4 and the stack 10, the temperature of the stacked rotor core 2 may exceed the temperature range in operation, or the temperature of the stacked rotor core 2 may be below the temperature range in operation.

In some examples, as long as the shaft 5 can be attached to the rotating body 6, the entire inner peripheral edges of the axial holes 3a and 4a of the end plates 3 and 4 do not necessarily match the inner peripheral edge of the axial hole 10a of the stack 10. For example, the entire inner peripheral edges of the axial holes 3a and 4a of the end plates 3 and 4 may be positioned radially outside the inner peripheral edge of the axial hole 10a of the stack 10.

In some examples, the permanent magnets 12 may be sealed by resin in the magnet insertion holes 16 after the shaft 5 is attached to the stack 10. Alternatively, the end plates 3 and 4 may be welded to the stacked rotor core 2 after the shaft 5 is attached to the stacked rotor core 2. In these cases, heat in shrink-fitting of the shaft 5 can be used for the resin sealing process or the welding process.

In some examples, the end plates 3 and 4 are positioned relative to the stack 10 by bringing the inclined surfaces S6 of the positioning members M13 and M23 into contact with the inclined surfaces S3 to S5 of the end plates 3 and 4 and the stack 10. However, the inclined surfaces S3 to S6 are not necessarily used for positioning them. For example, two pairs of positioning members movable in the intersecting directions may be used.

In some examples, in the welding process, the outer peripheral surface of the stack 10 may be welded at a plurality of places in the stacking direction while the welding torches M15 and M25 are moved in the top-bottom direction.

In some examples, the welding device 150 includes two welders M10 and M20. However, the welding device 150 may include one welder. In this case, for example, the welding torch of the welder may weld the end plate 3 and the stack 10 first and then move (lower) in the height direction to weld the end plate 4 and the stack 10 together. Alternatively, in this case, for example, the end plate 3 and the stack 10 may be welded together first, and thereafter the stacked rotor core 2 may be reversed together with the joined end plate 3 and set in the welding device 150 so that the end plate 4 and the stack 10 are welded together.

In some examples, the end plate 4 and the stack 10 are joined by applying laser from the welding torch toward the depressed groove 18 and the notches 22 and 24. However, the end plate 4 and the stack 10 may be joined by applying laser from the welding torch toward a portion other than the depressed groove 18 and the notches 22 and 24.

In some examples, the conveyors Cv1 to Cv3 are not necessarily used in conveying the stack 10, the stacked rotor core 2, or the rotating body 6. For example, they may be placed in a container and conveyed manually.

In some examples, the end plate may be disposed at least one end surface of the stack 10. Alternatively, the rotor 1 does not necessarily include an end plate. In this case, for example, the stack 10 is welded such that a plurality of blanked members W are joined. For example, a weld bead extending in the height direction from the upper end to the lower end of the stack 10 may be formed on the peripheral surface of the stack 10 such that all the blanked members W are joined. Alternatively, a weld bead may be formed on the peripheral surface of the stack 10 such that several blanked members W at the upper end and/or the lower end of the stack 10 may be joined. In these cases, curling of the blanked member W at the upper end and/or the lower end can be suppressed. Particularly in the latter case, since the weld bead is formed at a part of the upper end and/or the lower end, deterioration in magnetic characteristics of the rotor 1 by welding can be suppressed.

In some examples, a plurality of permanent magnets 12 may be inserted in one magnet insertion hole 16. In this case, a plurality of permanent magnets 12 may be arranged adjacent to each other along the stacking direction in one magnet insertion hole 16 or may be arranged in the longitudinal direction of the magnet insertion hole 16.

In some examples, the core body may be configured with anything other than the stack 10. The core body may be, for example, a compact of ferromagnetic powder or may be formed by injection-molding a resin material containing ferromagnetic powder.

In some examples, the present technique may be applied to a core product (for example, stacked stator core) other than the rotor 1. The present technique may be applied when a resin layer for insulating a stacked stator core from a winding coil is provided on the inner peripheral surface (resin injection portion) of a slot of the stacked stator core. The stacked stator core may be a split-type stacked stator core formed of a plurality of core pieces in combination or may be a non-split-type stacked stator core. In these stacked cores, the present technique may be applied when a plurality of blanked members are joined by charging molten resin into a through hole (resin injection portion) passing through in the height direction.

An example method of manufacturing a rotating body may include disposing an end plate on an end surface of a core body in a height direction, and forming the rotating body by welding the end plate and the core body together. The rotating body may be formed by welding the end plate and the core body together while a temperature of the core body and the end plate is within a predetermined operational temperature range associated with rotation of the rotating body in a manufactured state of operation. In this case, the core body and the end plate are welded in a state in which the core body and the end plate are in the temperature range when the rotating body actually rotates. With this configuration, even when the core body and the end plate have different thermal expansion coefficients, stress is less likely to act on the welding portion between the core body and the end plate in the actual rotation of the rotating body. Accordingly, a favorable joined state of the end plate to the core body can be maintained.

In some examples, forming the rotating body may include welding the end plate and the core body together using a welding tool as a primary heating source, while maintaining the temperature of the core body and the end plate within the predetermined operational temperature range of the rotating body using a secondary heating source. In this case, even if it takes time to weld the core body and the end plate together at a plurality of places, the temperature of the core body and the end plate is kept in the temperature range in operation during the welding process. With this configuration, a favorable joined state of the end plate to the core body can be maintained at all the welding portions between the core body and the end plate.

An example method may further include preheating the end plate and the core body using a heat source to increase the temperature within or above the predetermined operational temperature range of the rotating body prior to welding the end plate and the core body together. The rotating body may be formed by welding the end plate and the core body together before the temperature of the core body and the end plate falls below the predetermined operational temperature range of the rotating body. In the resin sealing process, the end plate and the core body are heated, and this heat can be used in the subsequent welding process to bring the temperature of the core body and the end plate into the temperature range in operation. With this configuration, it is no longer necessary to reheat the core body and the end plate using a heating source or the like in order to bring the temperature of the core body and the end plate into the temperature range in operation. Accordingly, the facility cost can be reduced, and the efficient use of heat energy can be achieved.

An example method may further include preheating the end plate and the core body using a heat source to increase the temperature above the predetermined operational temperature range of the rotating body prior to welding the end plate and the core body together. The end plate may be disposed on the end surface when the temperature of the core body is within or greater than the predetermined operational temperature range of the rotating body. In this case, when the end plate is disposed on the end surface, the end plate is heated by heat of the core body, so that the temperature of the end plate reaches the temperature range in operation. With this configuration, it is not necessary to heat the end plate separately using a heating source or the like. Accordingly, the facility cost can be reduced, and the efficient use of heat energy can be achieved.

An example method may further include cooling the core body by a cooler until the temperature of the core body falls within the predetermined operational temperature range of the rotating body before welding the end plate and the core body together. In this case, the time taken for cooling is reduced compared with when the core body is naturally cooled after the resin sealing process is performed. With this configuration, the time taken until the welding process is started is reduced, thereby increasing the manufacturing efficiency of the rotating body.

In some examples, forming the rotating body may include welding the core body and the end plate together such that a first part of an inner peripheral edge of a first axial hole passing through the end plate in the height direction is substantially aligned with a first part of an inner peripheral edge of a second axial hole passing through the core body in the height direction, and such that a second part of the inner peripheral edge of the first axial hole is positioned radially outside a second part of the inner peripheral edge of the second axial hole, while the temperature of the core body and the end plate is within the predetermined operational temperature range of the rotating body. In this case, since the part of the inner peripheral edge of the first axial hole substantially matches the part of the inner peripheral edge of the second axial hole, the end plate and the core body can be positioned using these parts as a reference. In this case, since the remaining part of the inner peripheral edge of the first axial hole is positioned radially outside the remaining part of the inner peripheral edge of the second axial hole, the insertion of the shaft is not hindered by the end plate when the shaft is inserted into the rotating body. With this configuration, the shaft can be easily attached to the rotating body.

In some examples, forming the rotating body may include welding the end plate and the core body together in a state in which a positioning member has been inserted in both of a first axial hole passing through the end plate in the height direction and a second axial hole passing through the core body in the height direction, and while the temperature of the core body and the end plate is within the predetermined operational temperature range of the rotating body. In this case, the welding process is performed in a state in which the end plate is positioned relative to the core body by the positioning member. This configuration can suppress displacement of the end plate from the core body by heat in welding.

In some examples, the positioning member may include a first inclined surface formed obliquely to the moving direction of the positioning member. The inner peripheral surfaces of the first and second axial holes each may include a second inclined surface formed obliquely to the moving direction at an angle corresponding to the first inclined surface. Forming the rotating body may include positioning the end plate relative to the core body by moving the positioning member radially outward in the moving direction such that the first inclined surface is in contact with the second inclined surface. In this case, the first inclined surface of the positioning member is in contact with the second inclined surface of the first and second axial holes, so that the end plate is positioned relative to the core body not only in the moving direction of the positioning member but also in the direction intersecting the moving direction. With this configuration, the end plate can be positioned relative to the core body more accurately only by moving the positioning member in one direction.

In some example, the thermal expansion coefficient of the end plate may be different from the thermal expansion coefficient of the core body.

We claim all modifications and variations coming within the spirit and scope of the subject matter claimed herein.

The invention claimed is:

1. A method of manufacturing a rotating body, the method comprising:
   disposing an end plate on an end surface of a stack in a height direction, wherein a plurality of blanked members stacked on each other form the stack; and
   forming the rotating body by welding the end plate and the stack together,
   wherein forming the rotating body includes welding the end plate and the stack together while a temperature of the stack and the end plate is within a predetermined operational temperature range associated with rotation of the rotating body in a manufactured state of operation.

2. The method according to claim 1,
   wherein forming the rotating body includes welding the end plate and the stack together using a welding tool as a primary heating source, while maintaining the temperature of the stack and the end plate within the predetermined operational temperature range of the rotating body using a secondary heating source.

3. The method according to claim 1, further comprising preheating the end plate and the stack using a heat source to increase the temperature within or above the predetermined operational temperature range of the rotating body prior to welding the end plate and the stack together,
   wherein forming the rotating body includes welding the end plate and the stack together before the temperature of the stack and the end plate falls below the predetermined operational temperature range of the rotating body.

4. The method according to claim 1, further comprising preheating the end plate and the stack using a heat source to increase the temperature above the predetermined operational temperature range of the rotating body prior to welding the end plate and the stack together,
wherein disposing the end plate on the end surface of the stack includes disposing the end plate on the end surface of the stack when the temperature of the stack is within or greater than the predetermined operational temperature range of the rotating body.

5. The method according to claim 1,
wherein the end plate is joined to a blanked member positioned in vicinity of upper end of the stack.

6. The method according to claim 1,
wherein the end plate is joined to a blanked member positioned at an upper end of the stack.

7. The method according to claim 1,
wherein the end plate is joined to a blanked member positioned in vicinity of lower end of the stack.

8. The method according to claim 1,
wherein the end plate is joined to a blanked member positioned at a lower end of the stack.

9. The method according to claim 1,
wherein the end plate includes a first axial hole passing through the end plate;
wherein the stack includes a second axial hole passing through the stack; and
the method further comprising inserting a shaft into the first axial hole and the second axial hole and shrink-fitting the shaft to the stack.

* * * * *